July 22, 1969     G. P. KLEIN     3,456,694
SLURRY DISPENSER

Filed Feb. 1, 1967     3 Sheets-Sheet 1

INVENTOR
GERHART P. KLEIN
BY
Robert Levine
ATTORNEY

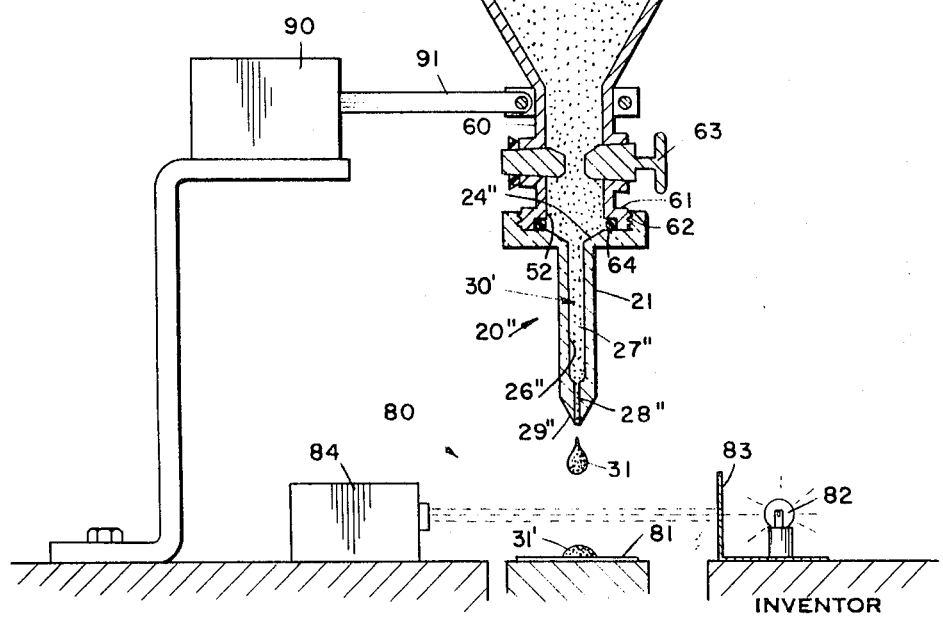

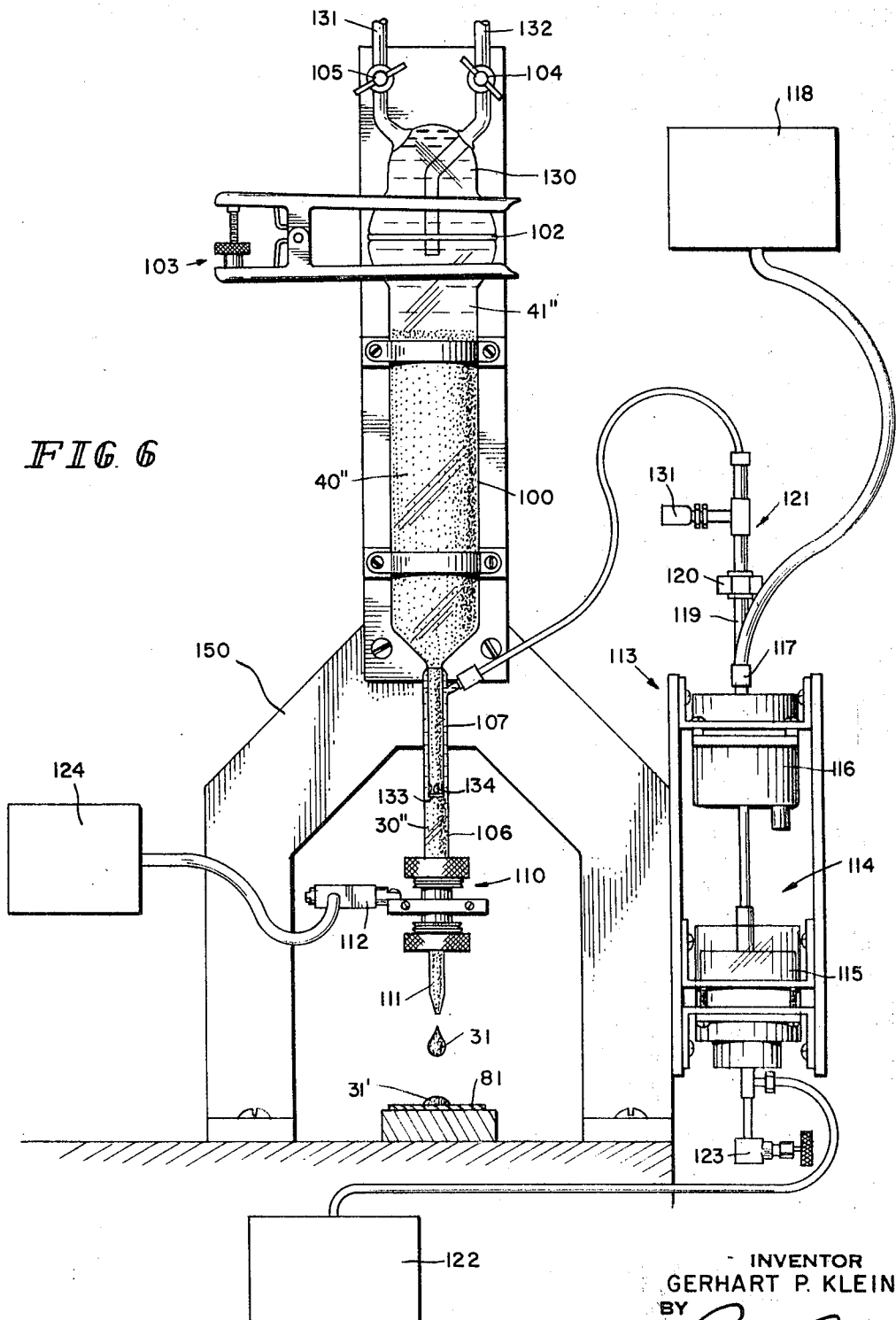

United States Patent Office 3,456,694
Patented July 22, 1969

3,456,694
SLURRY DISPENSER
Gerhart P. Klein, Manchester, Mass., assignor to P. R. Mallory & Co., Inc., Indianapolis, Ind., a corporation of Delaware
Filed Feb. 1, 1967, Ser. No. 613,182
Int. Cl. B67c 3/26, 3/24
U.S. Cl. 141—283                29 Claims

ABSTRACT OF THE DISCLOSURE

The present invention relates to a dispenser means and more particularly to a dispenser means for emitting slurry droplets including a metal powder and a suitable fluid carrier. The slurry droplets are emitted by the dispenser at a substantially uniform rate and have a substantially uniform weight. The metal powder contained within the slurry is used to fabricate electrolytic capacitors.

---

It is known that solid electrolytic capacitors may be manufactured using any one of several different techniques. For example, a predetermined amount of a film-forming metal powder such as tantalum, zirconium, aluminum, niobium, and titanium may be pressed to a desired density and then sintered so as to provide a sintered porous anode slug. In addition, the anode slug may be prepared using a volatile binder so as to produce an anode slug having a myriad of intercommunicating voids. An oxide film is formed on the film-forming material using any of the known electro-formation methods and an electrolyte of an aqueous solution of any one of a borate of boric acid, a citrate, a succinate, a tartrate, an oxalic, a sulfuric, a phosphoric or a chromic acid. The oxide film has asymmetrical conductive characteristics and serves as the dielectric for the capacitor. A coating such as manganese nitrate is applied over the oxide layer and pyrolytically converted into a semiconductive layer of manganese oxide. Thereafter, an electrically conductive material, such as graphite or silver paint, is applied over the semiconductive layer. The semiconductive layer and the electrically conductive coating serve as a cathode. The porous slug serves as the anode of the capacitor. After connecting electrically conductive leads to the anode and to the cathode, the solid electrolytic capacitor is suitably sealed in a metal case or is suitably molded within a plastic resin.

It was found that solid electrolytic capacitors can be fabricated using a continuous processing method by depositing a wet film forming metallic powder on foil fabricated from the same film-forming metal and sintering the metallic powder to form a structurally sound pellet bonded to the foil. The foil and the pellet, comprising the anode, have a dielectric film formed thereon when subjected to electro-formation. A semiconductor layer and an electrically conductive coating are added as described hereinbefore to form the cathode of the capacitor. The capacitor had leads attached thereto and was suitably encapsulated.

The continuous fabrication process, referred to hereinafter as the "powder on foil" technique, was conceived to eliminate handling problems experienced during the fabrication of small, solid electrolytic capacitors. The "powder on foil" technique of manufacturing small, solid capacitors significantly reduced the handling of the individual capacitors when compared to the handling required during the fabrication of solid electrolytic capacitors using sintered anode slugs. Also, it was found that elimination of the pressing operation and the binder significantly improved the quality of the solid electrolytic capacitors. The "powder on foil" capacitors can be operated safely and reliably at a higher percentage of the electro-formation voltage than the capacitors made in accordance with the above-mentioned sintered slug procedures.

Previously, "powder on foil" capacitors have been fabricated by placing a predetermined amount of a slurry of metallic powder and carrier fluid onto a film-forming metal foil provided with depressions or indentations for locating and retaining the slurry at a predetermined location on the foil. As stated previously, the metallic powder and the metal foil must be the same film-forming metal. The foil containing the slurry is processed in its entirety and the individual capacitors are separated from one another at the last step of the fabrication of individual capacitors. It is seen that the outlined procedure reduces the amount of handling of individual capacitors required during fabrication and substantially eliminates contamination and the possibility of structural damage during fabrication by eliminating the steps of pressing and adding binders to the powder prior to sintering.

The dispensing of the slurry droplets having a reproducible predetermined ratio of metallic powder to carrier fluid, having a substantially uniform weight and at a uniform rate onto a moving metal strip proves to be difficult and a source of possible capacitor non-uniformity and damage to otherwise satisfactory capacitors if the slurry droplets are not dispensed properly to the moving metal foil.

The present invention has eliminated the above-mentioned problems by using dispenser means having a capillary tube with a tapered tip that dispenses slurry droplets having substantially uniform weight and substantially at a uniform rate which may be varied if desired. It was found that in using the dispenser means, the by weight percent of the metallic powder contained by the slurry droplet was reproducible and that the rate at which the slurry droplets were emitted by the capillary tube could be maintained at a uniform rate or varied over a range of emission rates as desired. After the slurry droplets were located in appropriate depressions formed in the metal foil strip, the metallic powder contained within the individual slurry droplets settles in the fluid resulting in the wet packing of the metallic powder into a green compact of high density. The wet packing of the powder also produces a green compact having substantially a uniform exterior surface which, as a result thereof, has no loose particles associated therewith.

Therefore, it is an object of the present invention to provide a dispensing means which overcomes the above-mentioned problems.

Another object of the present invention is to provide a dispensing means for dispensing slurry droplets composed of metallic powder and a carrier fluid.

Yet another object of the present invention is to provide a dispensing device for dispensing slurry droplets of metallic powder and fluid having substantially uniform weight at a substantially constant rate.

A further object of the present invention is to provide a means for dispensing slurry droplets containing a metallic powder and a fluid, said droplets being an integral part of a continuous process for fabricating an infinite strip of anodes for solid electrolytic capacitors.

Yet another object of the present invention is to provide a dispensing means which accurately dispenses a predetermined amount of film-forming metallic powder to a film-forming metal strip, said powder and said strip cooperating so as to form an anode of an electrolytic capacitor.

Another object of the present invention is to provide a dispensing means including a capillary tube wherein the opening of the capillary tube has a non-wettable tip which does not exceed 100 mils in diameter so that slurry droplets emitted by said dispensing means retain a substantially uniform weight.

Yet another object of the present invention is to provide a dispensing means for dispensing slurry droplets wherein a vibratory means is used to assure a slurry having a determined amount of metallic powder.

Still another object of the present invention is to provide a dispensing means for dispensing slurry droplets containing metallic powder and carrier fluid that is characterized by its simplicity of construction.

Yet another object of the present invention is to provide a dispensing means for dispensing slurry droplets containing metallic powder and carrier fluid that has optimum reliability characteristics afforded by a compact construction having a minimum number of parts.

A further object of the present invention is to provide a dispensing means for dispensing slurry droplets onto a metallic strip which includes a photoelectric control means for predeterminately advancing said strip after said slurry droplet or droplets have been located on said strip.

Another object of the present invention is to provide a dispensing means for dispensing slurry droplets containing metallic powder and carrier fluid which can be readily fabricated and formed at low cost.

Yet still another object of the present invention is to provide a dispensing device for dispensing slurry droplets containing metallic powder and carrier fluid that is efficient, effective and accurate.

The present invention, in another of its aspects, relates to the novel features of the instrumentalities of the invention described herein for teaching the principal object of the invention and to the novel principles employed in the instrumentalities whether or not these features and principles may be used in the said object and/or in the said field.

With the aforementioned objects enumerated, other objects will be apparent to those persons possessing ordinary skill in the art. Other objects will appear in the following description, appended claims and appended drawing. The invention resides in the novel construction, combination, arrangement and cooperation of elements as hereinafter described and more particularly as defined in the appended claims. The appended drawings illustrate an embodiment of the present invention constructed to function in the most advantageous modes devised for the practical application of the basic principles involved in the hereinafter described invention.

In the drawings:

FIGURE 5 illustrates an automated dispenser means embodying the basic principles of the present invention.

FIGURE 6 illustrates another automated dispenser means embodying the basic principles of the present invention.

Generally speaking, the present invention relates to means and methods for dispensing slurry of metallic powder and carrier fluid as integral droplets of substantially uniform weight. A housing contains the slurry of metallic powder and carrier fluid and includes a capillary tube projecting downwardly therefrom. The capillary tube includes a tapered tip and a channel that extends the length thereof and has a predetermined diameter. The diameter of the channel as it exits the tip of the capillary tube determines the weight of the individual droplets of metallic powder and carrier fluid formed at the tip of the capillary tube assuming that the tip is fabricated from a wettable material such as glass. A means is used to exert an inwardly acting force against the slurry so as to cause the slurry to be dispensed as droplets having a predetermined weight and at a predetermined rate.

Referring now to the figures of the drawing and more particularly to FIGURE 1, the dispensing means is generally indicated by the reference number 10. The dispensing means includes a housing 11 fabricated from any suitable resilient material such as polyethylene or the like. The housing is collapsible when an inwardly acting pressure is exerted against the side walls 12 and 13 of the housing in the direction of arrows 14 and 15. It should be noted that the inner dimensions of the housing are reduced by the action of the inwardly acting pressure thereby decreasing the volume outlined by the inner dimensions of the housing. The housing includes an integral closed end 16 and an open end 17. The open end of the housing is part of a neck 18 which serves to narrow the open end 17 to a dimension substantially less than that of the diameter of the main portion of the housing. The neck includes a substantially continuous helical rib or thread 19 on the external surface thereof as illustrated in FIGURE 1.

The housing also includes means 20. Means 20 includes a capillary tube 21 which is used to substantially close the open end 17 of the housing. The means 20 includes a female section 22 that has a continuous helical rib or thread 23 that interfits with the thread 19 formed on neck of the housing. The means 20 includes a substantially conical-like recess 24 as illustrated in FIGURE 1. The conical-like recess includes a shoulder 25 that abuts the extremity of the neck so as to firmly seat the means 20 with respect to the neck of the housing. The capillary tube 21 is integral with and axially projects from means 20. The capillary tube includes an axial channel 26 which is comprised of two different sections. Section 27 of channel 26 has a substantially greater diameter than section 28 of the channel. The section 28 of the channel is included within tip 29 of the capillary tube. It should be noted that the tip 29 of the capillary tube is conical shaped. FIGURE 2 more clearly shows the configuration of the capillary tube. The means 20 may be fabricated from any suitable, rigid material such as glass, plastic and the like.

A slurry 30 is formed by mixing a film-forming metallic powder in a suitable fluid carrier. The film-forming metallic powder may be selected from the group consisting of tantalum, zirconium, aluminum, niobium and titanium. The carrier fluid may be selected from a group of liquids consisting of distilled water or water mixed with glycol and the like. The fluid or liquid carrier is selected because of its viscosity, surface tension and ease of removal characteristics from the metallic powder. As an example of a slurry 30 contained within the housing 11, about 50 grams of tantalum powder was thoroughly mixed with about 20 grams of distilled water using any suitable means to agitate the mixture so that a uniform slurry was formed. The housing 11 including means 20 was inverted to the position illustrated in FIGURE 1. After a few moments of uncontrolled discharge of slurry 30, the pressures exerted on the slurry from within the housing and through the channel in the capillary tube attained an equilibrium condition so that the remainder of the slurry is retained within the confines of the housing even though the housing is retained in the inverted position illustrated in FIGURE 1.

As illustrated in FIGURE 1, the metallic powder tends to settle in the inverted housing and forms a column of wet powder as shown at 40. The bulk of the carrier fluid 41 rises to the upper portions of the inverted housing. Upon applying a force acting inwardly on the housing as illustrated by arrows 14 and 15 in FIGURE 1, the volume of the housing is reduced accordingly. The pressure exerted on the metallic powder column and the carrier liquid from within the housing is now greater than the pressure exerted on the slurry through the channel in the capillary tube and the carrier liquid is forced to to permeate the metallic powder column and the slurry is displaced through the channel in the capillary tube. A hanging mass of the slurry appears at the tip of the capillary tube and upon reaching a predetermined weight is separated from the tip of the capillay tube as a droplet 31 composed of a slurry of metallic powder and a carrier liquid. The mass of slurry hanging at the end of the capillary is called a pendant drop.

The droplet 31 impinges on the metal foil strip 42 located directly below the tip of the capillary tube. On strip 42, the droplet assumes hemiellipsoidal shape 31'. The foil includes depressions or indentations (not shown) for predeterminately locating the droplet on the foil. The foil 42 is displaced in the direction of arrow 43 by any suitable means such as a conveyor or the like (not shown).

Figure 1:
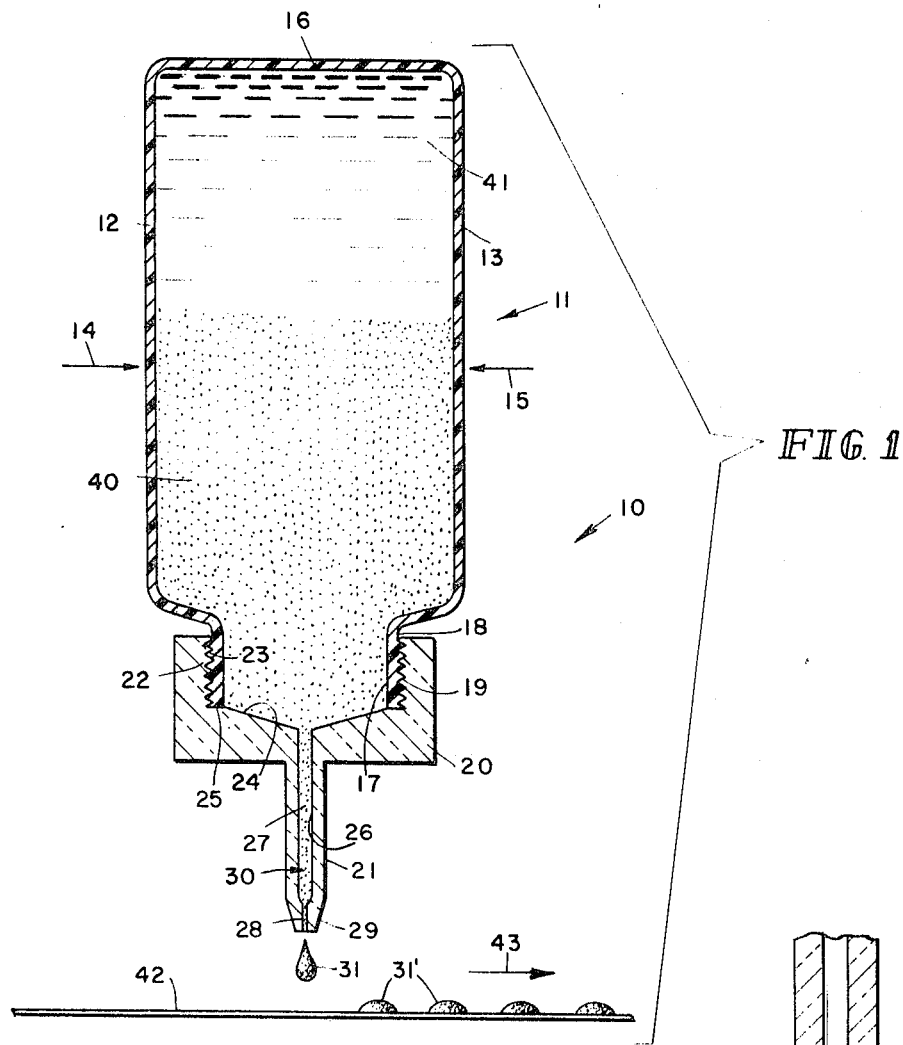
FIGURE 1 is a cross sectional view of the dispenser means illustrating the several components thereof and the relative position of these components.

It is seen that if a pressure unbalance exists, i.e., the weight of the slurry cannot be supported by the pressure external of the housing, pendant droplets of slurry are formed at the tip of the capillary and ultimately are separated therefrom as slurry droplet 31 illustrated in FIGURE 1. The weight of the slurry droplet is proportional to the surface tension of the slurry and the radius of the capillary. If the tip of the capillary is fabricated from a wettable material such as glass, the slurry will spread over the external portion of the tip of the capillary tube thereby forming a much larger and hence heavier slurry droplet than if the tip of the capillary tube included a non-wettable material, in which case the internal radius of the tip determined the size and hence the weight of the slurry droplet. This assumes, of course, that the surface tension of the slurry remains constant.

Figure 2:
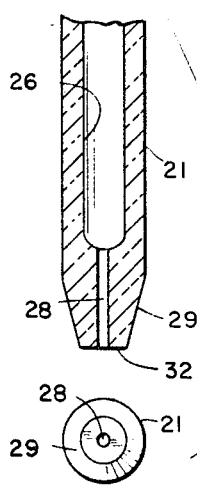
FIGURE 2 is a partial cross sectional view of and an end view of the capillary tube cooperatively associated with the dispenser means illustrated in FIGURE 1.

FIGURE 2 shows a capillary tube fabricated from glass. The glass capillary is wettable and hence a pendant drop will form over substantially the entire donut-like portion 32 of the tip of the capillary tube. It is seen that the external radius of the tip determines the weight of the pendant drop immediately prior to its separation from the capillary tube. The droplet 31 illustrated in FIGURE 2 weighed about 100 mg.

Figure 3:
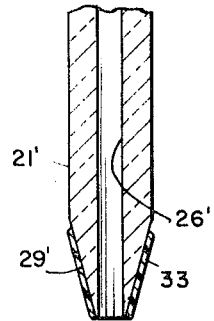
FIGURE 3 is a partial cross sectional view of and an end view of a capillary tube having a non-wettable sleeve placed over the tip thereof.

FIGURE 3 shows a capillary tube 21' and tip 29' fitted with a sleeve 33 fabricated from a suitable non-wettable material such as a plastic material sold under the trademark Teflon or coated with "RTV" silicone rubber. The capillary tube in FIGURE 3 will form a pendant drop whose weight is determined by the radius of the channel 26' in the tip of the capillary tube. It was found that a dispenser means using a non-wettable tip becomes unstable if the radius of the channel exceeds about 50 mils. The droplet separated from the capillary illustrated in FIGURE 3 weighed about 30 mg.

Figure 4:
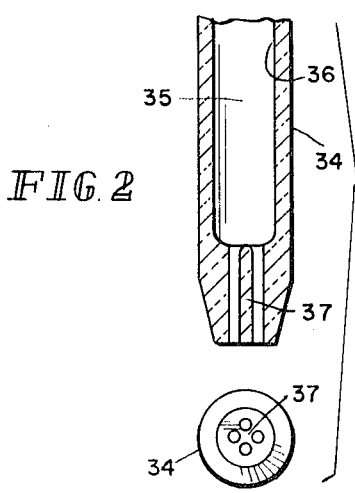
FIGURE 4 is a partial cross sectional view of and an end view of a capillary tube having a plurality of channels.

Larger droplets can be obtained by using a capillary tube 34 fabricated from glass that includes an axial channel 35 that is divided into two portions or sections as shown in FIGURE 4. The first portion 36 feeds the slurry to a second section 37 which is divided into four separate and distinct channels. The four separate channels feed the slurry material to the tip thereby forming a single pendant drop that has increased weight over the weight of the pendant drop formed by the capillary tube illustrated in FIGURE 1. It is seen that the weight of the slurry droplet is determined largely by the geometry of the tip and whether or not the tip is wettable by the slurry.

The rate at which pendant drops are formed at the tip of the capillary tube is proportional to the rate at which pressure is exerted against the side walls of the housing. This assumes that no additional powder and/or carrier liquid is introduced into the housing.

If additional carrier liquid is introduced into the housing, the pendant drop formation rate is proportional to the rate at which the carrier liquid is introduced into the housing assuming no external pressure is applied to the housing.

The dispensing of the slurry may be carried out so as to obtain relatively dry or relatively wet droplets. It was found that the metallic powder to carrier liquid ratio in the droplets is in direct proportion to the length and the diameter of the capillary tube. In addition, it was found that the shorter the length of the capillary tube for a given diameter the lower the water content contained within the individual droplets of the slurry. It was noted that a capillary length of about 5 mm. to about 20 mm. yielded a slurry droplet having a water content of about 8% to 15% by weight of the slurry droplet.

FIGURE 5 illustrates an automated means for dispensing a slurry 30' of a film-forming metal 40' and a carrier liquid 41'. A housing 50, fabricated from any suitable material such as glass and the like, includes a first open end 51 and a second open end 52. The end 51 includes a flange 53 having a thread 54 that mates with a corresponding thread 55 formed on flange 56 which is integral with feeder tube 57. A sealing means 58, seals such as a gasket or the like, is used to provide a tight seal between flanges 53 and 56. A stopcock valve 59 or the like is located across feeder tube 57 so as to permit flowing of the slurry into the housing 50. As disclosed hereinbefore, the rate at which pendant drops are formed, is largely determined by the rate of flow of the carrier liquid into the housing.

The housing includes a neck portion 60 which terminates in the open end 52. The neck portion 60 includes a flange 61 having a thread 62. The neck portion also includes a stopcock 63 for initiating and terminating the flow of the slurry through the neck portion of the housing.

The housing also includes a means 20". Means 20" includes a capillary tube 21" used to close the open end of the neck portion. A sealing means 64, illustrated in FIGURE 5, is used to provide a suitable seal between the neck portion and the means 20". The means 20" includes a substantially conical-like recess 24" used to direct the slurry to channel 26" in the capillary tube. The channel is divided into two separate and distinct sections. Section 27" of the channel has a substantially larger diameter than section 28" of the channel. Section 28" of the channel is generally located within tip 29" of the capillary tube. As is illustrated in FIGURE 5, the tip of the capillary tube is fabricated from glass. As disclosed hereinbefore, the weight of the pendant drop of slurry will be determined by the external radius of the tip of the capillary tube since the tip is fabricated from a wettable material, i.e. glass.

A syringe pump means 70 is connected to the housing 50 of the dispenser means through any suitable conduit means 71, such as pipe and the like. The frequency at which pendant drops are formed at the tip of the capillary tube is largely controlled by the flow of carrier liquid into the housing. The syringe pump produces a substantially uniform flow of carrier liquid at a determined rate. The rate of flow of carrier liquid into the housing may be varied from a few milliliters per hour to several hundred milliliters per hour by merely varying the rate of advance of the piston of the syringe pump.

A vibrator means 90 is connected to the housing through a suitable arm 91 which is fixedly connected to the vibrator means and to the neck of the housing. The vibrator means has an oscillation stroke substantially equivalent to the diameter of the largest particle of metallic powder contained within the slurry. It is suggested magnitude of the stroke must be limited so as not to adversely oscillate the capillary tube yet maintain uniform flow of the slurry through the capillary tube.

A photoelectric control means 80 is used to automatically advance the film-forming metal foil strip 81 upon the occurrence of a condition such as the interruption of a light beam by a single slurry droplet 31 or after the interruption of a predetermined number of slurry droplets. The inclusion of means to delay the movement of the foil strip until after a predetermined number of droplets have been deposited on the foil strip permits dispensing of several droplets on the same area of the foil or of dispensing multiples of the desired droplet weight.

The photoelectric control means 80 includes a light emission source 82, an apertured plate means 83 for directing the light beams of light emission source to a photosensitive cell 84 which actuates means (not shown) for advancing the foil strip a determined length of time after the light beam impinging on the photosensitive cell has been interrupted by the falling of the slurry droplet.

FIGURE 6 illustrates another automated means for dispensing a slurry 30" of a film-forming metal 40" and a carrier liquid 41". The slurry dispenser is retained in position by bracket 150. A housing 100 is fabricated from any suitable material such as glass and the like. The upper end of the housing is retained in intimate relationship with means 130. A sealing means 102, such as an O-ring gasket or the like, is used to provide a tight seal between means 130 and the upper end of the housing. A means 103 such as a clamp or the like is used to exert sufficient pressure on said joint so as to provide a tight seal therebetween. Means 130 includes tubes 131 and 132. Tube 132 extends below the sealing means 102 and is used to facilitate removal of the carrier liquid such as water having a level above the sealing means before the means 130 is removed from its position with respect to the housing as shown in FIGURE 6. A stopcock means 104 is cooperatively associated with tube 132 so as to open and close said tube as desired. Tube 131 is used to provide the housing with the carrier liquid 41". A stopcock means 105 is used in conjunction with stopcock means 104 to fill the housing with carrier liquid without trapping air therein. As disclosed hereinbefore, the rate at which pendant drops are formed, is largely determined by the rate of flow of the carrier liquid into the housing.

The housing includes a neck portion 107 which terminates as an open end. The neck portion 107 extends several inches from primary portion of the housing as shown in FIGURE 6. The lower end of the neck portion is closed by means 133. The lower end of the neck portion also includes a plurality of apertures 134 formed in the side of the neck portion through which said slurry 30" flows. The slurry flowing through the apertures 134 maintains a constant level independent of the powder level in the housing. Neck portion 107 interfits with dispenser tube 106 and is retained in spaced relationship from the inner wall of the dispenser tube as shown in FIGURE 6.

A capillary 111 is connected to the dispenser tube 106 in any suitable manner such as by a sealing means (not shown). The capillary tube includes a substantially conical-like recess used to direct the slurry to the channel formed in the capillary tube. The channel is divided into two separate and distinct sections. The first section of the channel has a substantially larger diameter than the second section of the channel. The second section of the channel is generally located within the tip of the capillary tube. As illustrated in FIGURE 6, the tip of the capillary tube is fabricated from glass. As disclosed hereinbefore, the weight of the pendant drop of slurry will be determined by the external radius of the tip of the capillary tube since the tip is fabricated from a wettable material, i.e., glass.

The dispensing head 110 includes a vibrator means 112 connected to the dispenser tube by a suitable arm which is fixedly connected to the vibrator means and to the dispenser tube. The vibrator means has an oscillation stroke substantially equivalent to the diameter of the largest particle of metallic powder contained within the slurry. It is suggested that the magnitude of the stroke should be limited so as not to adversely oscillate the capillary tube, yet maintain uniform flow of the slurry through the capillary tube. A compressed air source 124 suppplies compressed air to the vibrator means for operation thereof through a conduit connected to source 124 and the vibrator means.

A carrier fluid or water supply means 113 includes a water compressor 114 having an air cylinder and pump which permit pressurizing distilled water to about 100 p.s.i. by means of air pressure. Air and liquid are separated in order to prevent saturation of the water at high gas pressure. The air cylinder is shown at 115 and a 50 ml. liquid pump is shown at 116. A water inlet valve 117 is connected to a water reservoir 118 used for filling the pump with water. A water outlet means 119 is connected to a millipore in-line filter 120. The filter is connected to micro fine meter valve 121 which also includes a micrometer head 136. A source of compressed air 122 is used to maintain adequate pressure in air cylinder 115. A pressure release valve is shown at 123 to permit refilling of the pump.

The embodiment shown in FIGURE 6 has several distinct advantages over the embodiment shown in FIGURE 5. The housing can be made any capacity since the powder head in the dispenser tube is fixed. This eliminates changes in the flow resistance of the water during operation. Filling of the housing with powder is simplified through the design of the glass joint. Water is fed to the device by means of a high pressure water source and a metering valve. This permits better control of the flow rate.

Using the device shown in FIGURE 6, the dispenser had a dropping rate of about 15 drops per minute with a drop weight of about 33 mg. of dry tantalum powder. Over 90 percent of the droplets were within 5 percent of this weight.

While this invention is illustrated and described in embodiments, it will be understood that modifications and variations may be effected without departing from the scope of the novel concepts of this invention and as set forth in the appended claims.

Having thus described my invention, I claim:

1. In an apparatus for fabricating electrical capacitor anodes from a slurry of a metallic powder and a carrier liquid dispensed onto a strip, a container for dispensing slurry droplets from the container at a controlled flow rate comprising a housing including a capillary tube extending downwardly therefrom, said housing containing a moistened column of metallic powder adjacent said capillary tube and a column of carrier liquid adjacent said moistened powder, means for exerting a force against said carrier liquid and said metallic powder whereby said carrier liquid permeates said moistened metallic powder emitting slurry droplets from the tip of said capillary tube at a controlled flow rate, and a strip for receiving said slurry droplet.

2. The apparatus of claim 1, wherein said housing is collapsed by the application of an inwardly acting force whereby said droplets are emitted from said capillary tube at a substantially uniform rate.

3. The apparatus of claim 1, wherein said tip of said capillary tube includes a wettable substantially donut-shaped area whereby a slurry mass is formed over substantially the entire area of said donut-shape.

4. The apparatus of claim 3, wherein said wettable material is glass.

5. The apparatus of claim 1, wherein said tip of said capillary tube is non-wettable whereby a slurry mass does not spread over said tip.

6. The apparatus of claim 5, wherein said capillary tube includes a channel in said tip having a radius of about 50 mils or less.

7. The apparatus of claim 5, wherein said non-wettable material is plastic.

8. The apparatus of claim 1, wherein said tip of said capillary tube includes a plurality of channels through which said slurry moves.

9. The apparatus of claim 1, wherein said strip is a movable metal strip.

10. The apparatus of claim 1, wherein said means for exerting a force is a pressure means for exerting a substantially constant force on said moistened powder through said liquid.

11. The apparatus of claim 10, wherein said pressure means is a pump.

12. The apparatus of claim 10 further including means for allowing additional metallic powder and liquid to move into said housing.

13. The apparatus of claim 10, further including means for terminating the emission of the slurry droplets.

14. The apparatus of claim 10 further including means for advancing said strip after said slurry is deposited thereon.

15. The apparatus of claim 14, wherein said means for advancing said strip includes a photosensitive cell interrupted by the slurry droplets whereby said strip is advanced.

16. The apparatus of claim 1 further including vibratory means connected to said housing for assisting in providing substantially uniform flow of said slurry through said tip of said capillary tube.

17. The apparatus of claim 16, wherein said vibratory means has an oscillation stroke substantially equivalent to the diameter of the largest particle of said metallic powder.

18. In an apparatus for fabricating electrical capacitor anodes from a slurry of a metallic powder and a carrier liquid dispensed onto a strip, a container for dispensing slurry droplets from the container at a controlled flow rate comprising
a housing including a capillary tube extending downwardly therefrom, said housing containing a moistened column of metallic powder adjacent said capillary tube and a column of carrier liquid adjacent said moistened powder,
means for exerting a pressure against said carrier liquid whereby said carrier liquid permeates said moistened metallic powder emitting slurry droplets